Figure 1:
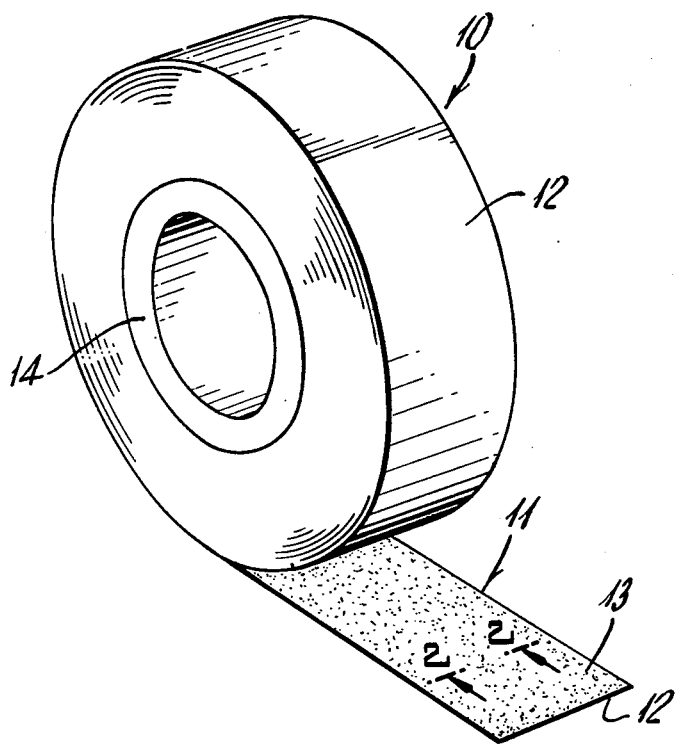

United States Patent [19]

Puskadi

[11] 4,196,254
[45] Apr. 1, 1980

[54] PRESSURE-SENSITIVE ADHESIVE TAPE WITH PRIMER

[75] Inventor: Frank Puskadi, Milltown, N.J.

[73] Assignee: Johnson & Johnson, New Brunswick, N.J.

[21] Appl. No.: 903,283

[22] Filed: May 5, 1978

[51] Int. Cl.$^2$ .................... B32B 27/08; C09J 7/02
[52] U.S. Cl. .................... 428/341; 428/355; 428/450; 428/447; 428/448; 428/910; 428/520; 428/451
[58] Field of Search .............. 428/355, 450, 447, 448, 428/520, 451, 341

[56] References Cited

U.S. PATENT DOCUMENTS 3,241,662   3/1966   Robinson et al. ............ 428/343

OTHER PUBLICATIONS

Polniaszek et al., "Improving Adhesives with Silane Adhesion Promoters," 7/1968, *Adhesives Age*, pp. 25–27.

Sterman et al., "How to Promote Adhesion with Silicones & Silanes" 7/1965, *Adhesives Age*, pp. 6–11.

*Primary Examiner*—P. C. Ives
*Attorney, Agent, or Firm*—Alice O. Robertson

[57] ABSTRACT

A pressure-sensitive adhesive tape having a polyolefin, polyester or metal foil backing and an acrylate pressure-sensitive adhesive layer firmly adhered to the backing through a primer layer comprising a primer composition consisting essentially of an intimate mixture of a primary amino-functional trialkoxy silane and a particular carboxylated polymer component having an affinity for the acrylate adhesive. The primer composition and the silane are distributed in the primer layer in amounts of at least about five milligrams per square yard primer composition and at least about one milligram per square yard silane, and the weight ratio of silane to carboxylated polymer component is between about 1 to 10 and about 4 to 1.

11 Claims, 2 Drawing Figures

PRESSURE-SENSITIVE ADHESIVE TAPE WITH PRIMER

DISCLOSURE OF INVENTION

The present invention relates to pressure-sensitive adhesive tapes having a flexible film or foil backing which is difficult to adhere to, more particularly to such tapes having a polyester or polyolefin film or a metal foil backing and an acrylate adhesive layer coated on one of its major surfaces.

Anchorage of acrylate pressure-sensitive adhesives to polyolefin films such as polyethylene and polypropylene films has been a long time problem. Activating one surface of the film produces a marked improvement in the bond to this type of adhesive. Such an improvement is covered by U.S. Pat. No. 3,241,662. Tape made by this process is quite adequate with respect to plant processing, tape dispensing, and normal packaging applications. However, this tape fails when applied to glass because the adhesion of acrylics to glass is unusually high and mass transfer sometimes occurs. Since transparent tapes are frequently used on store windows to hold up signs and in various other applications to glass and other very smooth surfaces, the need for an extremely high bond between acrylic adhesives and activated polyethylene and polypropylene films is needed.

Similarly, tapes produced by coating polyester films and thin metal foils with acrylate pressure-sensitive adhesives will fail in anchorage by delamination of the adhesive from the backing when the tape is stripped from a glass application surface, for instance.

Thin layers of highly reactive silanes have been suggested as adhesive promoters or primers to enhance adhesion between various materials including adhesives and other substrates. However, it is extremely difficult, if not impossible as a practical matter, in the production of pressure-sensitive adhesive tapes to control the coating weights of these silanes closely enough to prevent them from damaging the relatively thin backing films and foils which are employed in the production of such tapes, on the one hand, or from detracting from tack or other properties of the adhesive layer, itself, on the other hand.

I have invented an acrylate pressure-sensitive adhesive tape which possesses excellent anchorage between the adhesive and backings such as polyolefins, polyesters and metal foils which are difficult to adhere to. The tape of my invention has a primer composition between the adhesive and backing which composition consists essentially of an intimate mixture of a primary amino-functional trialkoxy silane and a carboxylated polymer component having an affinity for the acrylate adhesive layer. The polymer component protects both the backing and the adhesive from the effects of the silane yet, together with the silane, provides superior anchorage between the backing and the acrylate adhesive layer. It is believed that the polymer component acts to immobilize the silane or hold in place so that it has less of a tendency to attack the backing or migrate through the pressure-sensitive adhesive layer and detract from its properties.

According to my invention the primer composition and the silane contained therein are distributed in the primer layer in amounts of at least about five milligrams per square yard primer composition and at least about one milligram per square yard silane, and the weight ratio of silane to carboxylated polymer component is between about 1 to 10 and about 4 to 1.

Typical primary amino-functional trialkoxy silanes of my invention are N(beta-aminoethyl) gamma-aminopropyltrimethoxysilane and gamma-aminopropyltriethoxysilane.

The carboxylated polymer component of my invention may be a carboxylated ethylene vinyl acetate resin such as the terpolymer of ethylene, vinyl acetate and acrylic or methacrylic acid which preferably contains about 20 to 30 weight percent of vinyl acetate. It also may be a carboxylated acrylic adhesive polymer which comprises a major amount of medium chain length alkyl acrylate monomer component and a minor amount of cohesion inducing short chain monomer component. This acrylic adhesive polymer also may include a small amount of an acrylic or methacrylic acid component. The carboxylated polymer component of the primer composition of my invention also may comprise a major amount of a polyester polymer together with a minor amount of a carboxylated acrylic adhesive polymer of the type just described. Lower melting point mixed polyesters are preferred for this purpose. In this embodiment of the adhesive tape of this invention the mixed polyester consists essentially of a highly crystalline polyester monomer component and a substantially less crystalline polyester monomer component. This type of copolyester normally possesses a melting point of not above about 200° C. One such polyester is polymerized from propylene glycol, glycerol, terephthalic acid and isophthalic acid. Other such polyesters include copolyesters of ethylene terphthalate and ethylene isopthalate, butylene terephthalate and butylene isophthalate, ethylene terephthalate and ethylene azelate, ethylene terephthalate and ethylene sebacate, ethylene terephthalate and butylene adipate, ethylene terephthalate and butylene terephthalate, etc. In the above copolyesters, the highly crystalline monomer component, i.e., the ethylene terephthalate or the butylene terephthalate, is the major constituent, i.e., the less crystalline component represents less than 50 mole percent of the copolyester, preferably less than 40 percent.

The primer of this invention is quite efficient. For instance, dried primer weights ranging as low as 5 milligrams per square yard are quite effective. The primer composition may be applied from solution by any of the conventional techniques, such as rotogravure application, Meier rod application, knife coating, etc. One of the advantages of the tape of this invention is that the adhesive may be applied immediately after the primer has been dried or it may be applied days later. Apparently, the primer composition becomes fixed in position immediately after drying with the silane immobilized therein.

If a polyethylene or polypropylene backing film is used it may be treated by any of the conventional techniques for activating the surface, such as by electrostatic or flame treatment, or other methods, several of which are disclosed in U.S. Pat. No. 3,241,662. Any conventional pressure-sensitive acrylate adhesive may be applied to the primer surface. The choice of the adhesive depends upon the adhesion properties desired. Most conventional acrylate adhesives are based on 2-ethylhexyl acrylate. This polymer by itself is usually too soft and low in adhesion. Therefore it is a common practice to copolymerize 2-ethylhexyl acrylate with one or more cohesion inducing monomers such as styrene, vinyl acetate, acrylic acid, methacrylic acid, maleic anhydride, an acrylamide, etc.

A preferred acrylate pressure-sensitive adhesive of this invention is based upon an adhesive copolymer of monomers consisting essentially of a major amount of a medium chain length alkyl acrylate monomer and preferably a minor amount of a hardness or cohesion inducing short chain monomer, plus a very small amount of an alkoxy silyl cross-linking monomer polymerizable in the acrylate system. These monomers preferably are copolymerized together with a relatively small amount of an unsaturated carboxylic acid monomer which improves the qualities of the tape and provides a source of active hydrogens in the adhesive. This acrylate or acrylic adhesive preferably is used as the carboxylated acrylic adhesive polymer of the primer composition of this invention, as well as for the acrylate pressure-sensitive adhesive layer of the tape of this invention.

The medium chain length alkyl acrylate monomers of this invention generally are those averaging about 4–12 carbon atoms in the alcohol moiety and include, butyl, hexyl, 2-ethylhexyl, octyl, decyl, and dodecyl acrylates, and the like, alone or in combination with one another or with higher and lower alkyl acrylates. The medium chain length acrylate monomer is present in the adhesive copolymer of this invention in a major amount by weight of the total monomers, preferably in the amount of about 60–80 parts by weight of the total adhesive monomer solids.

The cohesion inducing short chain monomers of this invention may be selected from vinyl acetate, methyl acrylate, methyl methacrylate, and the like, and preferably are present in the total adhesive monomers in the amount of about 10–30 parts. However, even small amounts of these and other short chain monomers may be used.

The alkoxy silyl cross-linking monomer of this embodiment of the invention may be prepared as described in U.S. patent application Ser. No. 399,837, filed Sept. 28, 1964 now abandoned in favor of Ser. No. 32,756, filed Apr. 28, 1970, which in turn was abandoned in favor of Ser. No. 475,707, filed June 3, 1974, now U.S. Pat. No. 4,112,213, and comprises an alkoxy silyl alkyl group and an unsaturated functional terminal group copolyerizable with the other monomers. This functional terminal group preferably is an acrylate or substituted acrylate group such as

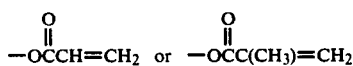

The polymerizable cross-linking alkoxyl silyl alkyl groups found to be particularly effective are those having the general formula

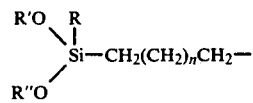

where R' and R" are either $CH_3$— or $CH_3CH_2$— and R is one of the group consisting of $CH_3$—, $CH_3CH_2$, $CH_3O$— and $CH_3CH_2O$— and n is a number of 0 through 8. A preferred silyl cross-linking monomer is 3-methacryloxy-propyltrimethoxy-silane, i.e.,

The amount of the silyl cross-linking monomer to be included in the copolymer depends on the exact constituents of the adhesive copolymer and the degree of cross-linking desired. Very small amounts are found to be effective. The silyl cross-linking monomer will generally be included in amounts of about 0.005 to 0.1 or 0.2 or more by weight of the total monomers with about 0.01–0.05 parts being preferred.

In one embodiment of this invention the acid monomers may be selected from acrylic acid, methacrylic acid and itaconic acid, with acrylic acid being preferred. In that case they are present in the total monomers in the amount of about 2–6 parts, preferably 2.5–4.5 parts when acrylic acid is employed for this purpose.

Figure 2:
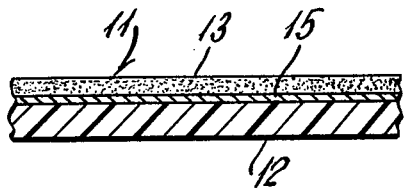

Other and further advantages of this invention will appear to one skilled in the art from the following description and claims taken together with the drawings, wherein:

FIG. 1 is a view in perspective of a roll of tape according to one embodiment of the invention, and FIG. 2 is a greatly enlarged fragmental sectional view taken along the line 2—2 of FIG. 1 with the thickness of the various layers exaggerated for the purposes of clarity.

Referring to the drawings, there is shown a roll 10 of pressure-sensitive adhesive tape 11, according to one embodiment of this invention, which comprises a biaxially oriented polypropylene film backing 12 having one of its major surfaces activated as described hereinbefore, a primer coating 15 of this invention applied to the activated surface of the film, and a layer 13 of an acrylate pressure-sensitive adhesive composition according to this invention coated over the primer. The tape 11 normally is wound upon itself around a core 14 with the adhesive side of the tape facing inwardly toward the core as shown.

The following Examples I–XI are given only by way of illustration and are not intended to limit the scope of the present invention in any way. Table A lists the proportions in parts for the ingredients of the various primer compositions of Examples I-X together with primer composition, silane and carboxylated polymer weight in dry mg./sq. yds. deposited in the primer layer for the tapes of this invention which are produced.

Pressure-sensitive adhesive tapes are produced according to these examples by coating the electrostatically activated surface of a 2.4 mil thin biaxially oriented polypropylene film backing in Examples I-X, with the primer compositions listed in Examples I-X, with the primer compositions listed in Table A using a number 5 Meier Bar at 240° F. and 16 ft./min. Then, immediately after drying the primer, the primed surface of the backings in Examples I-X is coated with the acrylate adhesive composition of Table B using a reverse roll coater at 180°–220° F. and 12 ft./min. to deposit an adhesive layer at a dried coating weight of 0.90 oz./yd.². A control tape was produced in the same manner without a primer by coating the acrylate adhesive of Table B directly onto the activated surface of the polypropylene film backing using the techniques described for Examples I-X. The resulting adhesive coated sheets then were slit into tapes of one inch width and the tapes were tested for adhesive anchorage to backing as described below, with the results being indicated in Table A.

Anchorage is measured in ounces per inch recorded on an Instron tensile tester operated at 12 inches per minute to strip the adhesive of this invention from its backing. This is accomplished by laminating a one inch by twelve inch sample strip of very high adhesion and high anchorage pressure-sensitive adhesive tape "adhesive-to-adhesive" to a one by twelve inch sample of the adhesive tape of this invention, and then separating the two at 90° as described above. The separation force then is recorded. Normally this strips the adhesive of this invention from its backing, although delamination or splitting of the adhesive, itself, also may occur to some extent.

TABLE A

| Ingredient | I | II | III | IV | V | VI | VII | VIII | IX | X | XI |
|---|---|---|---|---|---|---|---|---|---|---|---|
| Dow Z-6020 Silane, 5% Sol. in Toluene and isopropyl alch. (6:4) | 10 | 10 | 10 | 5 | 3 | 5 | 10 | 3 | 5 | 10 | |
| Elvax-4310, 5% Sol. in toluene | 10 | 5 | 15 | 5 | | | | | | | |
| Vitel - 307,5% sol. in toluene | | | | | | | | 12 | 15 | 15 | |
| R-400 acrylic adhesive, 5% Sol. in Toluene | | | | | 7 | 10 | 10 | 4 | 5 | 5 | |
| Toluene | 46 | 35 | 58 | 23 | 23 | 35 | 46 | 44 | 58 | 70 | |
| Primer composition weight mg./sq.yd. | 12 | 12 | 12 | 12 | 12 | 12 | 12 | 11.9 | 12 | 12 | |
| Silane weight mg./sq.yd. | 6 | 8 | 4.8 | 6 | 3.6 | 4 | 6 | 1.9 | 2.4 | 4 | |
| Carboxylated polymer mg./sq.yd. | 6 | 4 | 7.2 | 6 | 8.4 | 8 | 6 | 10 | 9.6 | 8 | |
| Anchorage oz./in., 7 days room temp. | 86 | 92 | 93 | 90 | 89 | 91 | 84 | 92 | 94 | 91 | 42 |
| | 92 | 97 | 99 | 95 | 93 | 96 | 91 | 96 | 98 | 96 | 45 |
| Anchorage oz./in., 7 days, 150° F. | 89 | 90 | 93 | 95 | 93 | 94 | 95 | 93 | 94 | 92 | 92 |
| | 95 | 96 | 98 | 100 | 98 | 97 | 99 | 96 | 100 | 96 | 95 |
| Anchorage oz.,in., 7 days, 120° F. | 90 | 92 | 88 | 90 | 91 | 89 | 90 | 93 | 93 | 91 | 46 |
| | 94 | 95 | 92 | 92 | 94 | 92 | 93 | 95 | 96 | 94 | 52 |

TABLE B

| Ingredient | Parts |
|---|---|
| 2-ethylhexylacrylate | 76.5 |
| Vinyl acetate | 18.7 |
| Acrylamide | 1.5 |
| Maleic anhydride | 0.9 |
| Acrylic acid | 0.7 |
| T-butylperoxyoctoate | 1.6 |
| Gamma-methacryloxy propyl trimethoxysilane | 0.9 |
| | 100.0 |

The above examples show the vastly increased anchorage achievable between adhesive and backing in the tapes of this invention, as well as the reliability of the results. In other words, the tapes of Examples I-X show about double the anchorage to backing when compared with the unprimed control of Example XI for room temperature and 120° F. aging. Strangely enough the control exhibits high anchorage at 150° F. aging. This might be an effect of the higher humidity. At any rate, it is an erratic phenomenom and cannot be relied upon to assure anchorage under any conditions. The tape of my invention, on the other hand, does exhibit high anchorage at a consistent level under all conditions, even when the adhesive is coated on the primed backing of polypropylene film which is the most difficult tape backing to adhere to.

In the foregoing examples, Dow Z-6020 Silane is an N(beta-aminoethyl) gamma-amino-propyltrimethoxy-silane coupling agent offered by Dow Chemical Co.

Elvax-4310 is a terpolymer of ethylene, vinyl acetate and acrylic or methacrylic acid offered by E. I. DuPont Co. The vinyl acetate content is about 25–28 percent by weight and the terpolymer has an acid number of 6 in mg. potassium hydroxide per gram polymer.

Vitel-307 is a product of Goodyear Chemical Co. It is a lower melting point mixed copolyester polymerized from propylene glycol, glycerol, terephthalic acid and isophthalic acid.

R-400 acrylic adhesive is polymerized from 75 parts 2 ethylhexylacrylate, 21 parts methylacrylate, 4 parts acrylic acid and 0.02–3 parts gamma methacryloxy propyl trimethyoxysilane.

Having now described the invention in specific detail and exemplified the manner in which it may be carried into practice, it will be readily apparent to those skilled in the art that innumerable variations, applications, modifications, and extensions of the basic principles involved may be made without departing from its spirit or scope.

What is claimed is:

1. A pressure-sensitive adhesive sheet which comprises:
   (1) a backing layer of (a) polyethylene or polypropylene film having one of its major surfaces activated to improve its anchorage characteristics, or (b) polyester film or (c) metal foil;
   (2) a primer composition coated on one major surface of said backing layer to form a primer layer firmly adhered thereto, said major surface being for polyethylene and polypropylene films, the activated surface; and
   (3) a normally tacky and pressure-sensitive acrylate adhesive layer firmly adhered to said backing layer through said primer;
   wherein said primer composition consists essentially of an intimate mixture of a primary amino-functional trialkoxy silane and a carboxylated polymer component having an affinity for the acrylate adhesive layer, said carboxylated polymer component being (a) a carboxylated ethylene vinyl acetate resin, or (b) a carboxylated acrylic adhesive polymer, or (c) the combination of a major amount of a polyester polymer and a minor amount of a carboxylated acrylic adhesive polymer; and
   wherein said primer composition is distributed in the primer layer in such amounts as to provide at least about five milligrams per square yard of primer composition and at least about one milligram per square yard of silane, with the weight ratio of silane to carboxylated polymer component being between about 1 to 10 and about 4 to 1.

2. A pressure-sensitive adhesive sheet according to claim 1, wherein the carboxylated ethylene vinyl acetate resin is the terpolymer of ethylene, vinyl acetate and acrylic or methacrylic acid.

3. A pressure-sensitive adhesive sheet according to claim 2, wherein the vinyl acetate content of the ethylene vinyl acetate resin is between about 20 and 30 weight percent.

4. A pressure-sensitive adhesive sheet according to claim 1, wherein the carboxylated acrylic adhesive polymer comprises a major amount of medium chain length aklyl acrylate monomer component and a minor amount of cohesion inducing short chain monomer component.

5. A pressure-sensitive adhesive sheet according to claim 4, wherein the carboxylated acrylic adhesive polymer includes an acrylic or methacrylic acid component.

6. A pressure-sensitive adhesive sheet according to claim 1, wherein the polyester polymer is a lower melting point mixed polyester.

7. A pressure-sensitive adhesive sheet according to claim 6, wherein the mixed polyester is polymerized from propylene glycol, glycerol, terephthalic acid and isophthalic acid.

8. A pressure-sensitive adhesive sheet according to claim 1, wherein the silane is N(beta-aminoethyl) gamma-aminopropyltrimethoxysilane.

9. A pressure-sensitive adhesive sheet according to claim 1, wherein said acrylate adhesive layer is coated over said primer in the form of an adhesive composition comprising a copolymer of monomers comprising
   (a) a major amount of a medium chain length alkyl acrylate monomer averaging about 4–12 carbon atoms in the alcohol moiety, and said major amount being from about 60 to 80 parts by weight of total adhesive monomer solids, and
   (b) a minor amount of a cohesion inducing short chain monomer copolymerizable with the other monomers, said minor amount being from about 10 to 30 parts by weight based on total weight of adhesive solids.

10. A pressure-sensitive adhesive sheet according to claim 9, wherein said adhesive monomers also include an alkoxy silyl cross-linking monomer having an unsaturated functional terminal group copolymerizable with the other monomers.

11. A pressure-sensitive adhesive sheet according to claim 9, wherein said adhesive monomers also include an unsaturated carboxylic acid monomer copolymerizable with the other monomers.

* * * * *